United States Patent [19]

Galand et al.

[11] Patent Number: 5,007,092

[45] Date of Patent: Apr. 9, 1991

[54] METHOD AND APPARATUS FOR DYNAMICALLY ADAPTING A VECTOR-QUANTIZING CODER CODEBOOK

[75] Inventors: Claude Galand; Jean Menez, both of Cagnes Sur Mer; Michèle Rosso, Nice, all of France

[73] Assignee: International Business Machines Corporation, Armonk, N.Y.

[21] Appl. No.: 420,966

[22] Filed: Oct. 13, 1989

[30] Foreign Application Priority Data

Oct. 19, 1988 [EP] European Pat. Off. ......... 88480060.8

[51] Int. Cl.$^5$ ............................................. G10L 7/02
[52] U.S. Cl. ..................................................... 381/36
[58] Field of Search .................................. 381/29–41; 364/513.5; 375/122

[56] References Cited

U.S. PATENT DOCUMENTS 4,720,861  1/1988  Bertrand ............................. 381/36

OTHER PUBLICATIONS

Paul, "An 800BPS Adaptive Vector Quantization Vocoder Using A Perceptual Distance Measure", ICASSP 83, pp. 73–76.
Makhoul et al., "Vector Quantization in Speech Coding", IEEE Proceedings, vol. 73, No. 11, 11/85, pp. 1551–1588.

Primary Examiner—Dale M. Shaw
Assistant Examiner—John A. Merecki
Attorney, Agent, or Firm—Edward H. Duffield

[57] ABSTRACT

A signal vector quantizing coder (CELP) is provided with an adaptive codebook originally loaded with preselected codewords. The codebook is split into a fixed contents portion and a fixed length adaptive contents portion. During coding operations, the codewords dynamically selected for coding the coder input signal are shifted into the fixed length adaptive codebook section for codebook contents updating purposes.

7 Claims, 9 Drawing Sheets

CODER

DECODER

METHOD AND APPARATUS FOR DYNAMICALLY ADAPTING A VECTOR-QUANTIZING CODER CODEBOOK

This invention deals with digital voice coding and more particularly with low bit rate voice coding.

BACKGROUND OF THE INVENTION

Low bit rate voice coding schemes have been proposed wherein blocks of voice samples are coded into a table address and a gain factor. Such coders are known as vector quantizing coders. For further references on the type of coding involved, one may refer to "Fast Code-Excited Linear Prediction (CELP) Coding Based on Algebraïc Codes", by J. P. Adoul et al, in International Conference on Acoustic, Speech and Signal Processing (ICASSP) 1987; and to "Code-Excited Linear Prediction (CELP) High-quality Speech at Low Bit Rates", by M. R. Schroeder and B. S. Atal, ICASSP 1985.

Obviously, the CELP coder quality as well as its performances are particularly dependent upon the table contents. Said table contents (i.e. Codebook) is conventionally loaded with statistically set codewords, which does provide a good tradeoff, but is certainly not an optimal solution on a case by case basis.

OBJECT OF INVENTION

One object of this invention is to provide a process and device for dynamically optimizing a CELP codebook contents. Such an optimizing is achieved by dynamically updating said codebook.

DESCRIPTION OF PREFERRED EMBODIMENT OF THE INVENTION

Figure 1:
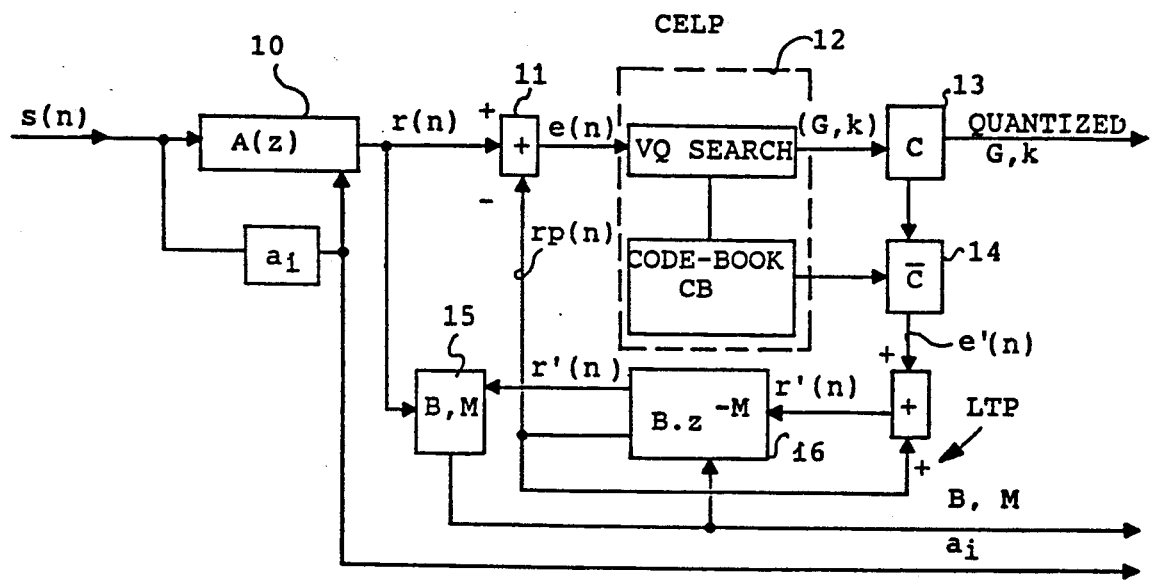
FIGS. 1 and 2 represent prior art.

Even though the invention applies to any vector quantizing scheme it suits particularly to a coding architecture combining CELP with Long Term Prediction. An efficient technique for combining Code Excited Linear Predictive (CELP) Coding with Long-Term Prediction has already been proposed in a co-pending application No. 88480006.1 filed Mar. 8, 1988. Its basic principles are summarized here with reference to FIGS. 1 and 2 for coding and correlative decoding, respectively.

As per coding, the speech signal $s(n)$ is first decorrelated (filtered) through a so called short-term analysis performed into an adaptive predictor $A(z)$ (10) the coefficients of which (ai) are derived from a pre-emphasized $s(n)$, to provide a residual signal $r(n)$. A predicted residual $rp(n)$ is subtracted from $r(n)$ in a device (11) providing an error residual signal $e(n)$ further encoded by blocks or sub-blocks of samples into a table address (k) and a gain factor (G) for each block or subblock, within a CELP coder (12). Briefly stated, the CELP coder includes a vector quantizer (VQ) searching device and a codebook (CB). Encoding therein is performed on a block of samples basis, and involves finding a block of codebook stored samples (i.e. a codeword) best matching the $e(n)$ block to be encoded. Best matching means here providing the lowest global block difference energy (mean squared error) assuming a gain factor G be considered between the codeword and the block of $e(n)$ samples to be CELP coded. One needs then simply code/quantize the codeword address k and gain G, within a coder C (13). Block Companded PCM (BCPCM) techniques, as proposed by A. Croisier in "Progress in PCM and Delta Modulation: Block Companded Coding of Speech Signal", presented by A. Croisier at the 1974 International Seminar On Digital Communications - Zurich, may be used to perform the functions of device 13.

The selected codeword is also decoded in a device $\overline{C}$ (14) to generate a decoded error residual signal $e'(n)$ fed into a Long-Term Prediction (LTP) loop providing the predicted residual signal $rp(n)$. To that end, a pitch harmonic value M and a gain or ratio factor B are computed in a device (15) and used to tune a filter (16) including an M long delay line and a B multiplying device (not shown). Said filter (16) is fed with a signal $r'(n) = rp(n) + e'(n)$.

The finally CELP/LTP coded $s(n)$ includes several G, k, B, M, and a set of PARCOR related coefficients ai.

Figure 2:
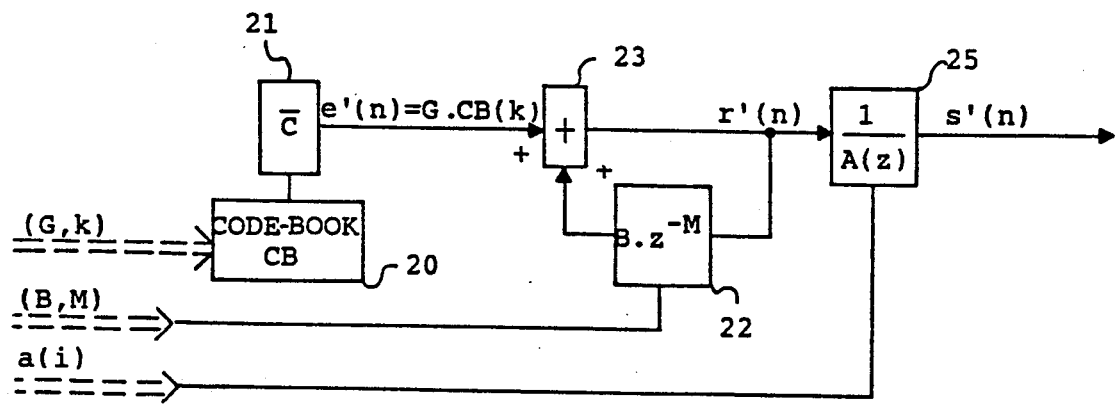

The decoding operations made to recover a decoded $s(n)$, i.e. $s'(n)$ are schematically represented in FIG. 2. The codeword address k is used to address a local codebook and fetch out a selected codeword $CB(k)$ therefrom. Said codeword is multiplied by G into a decoder $\overline{C}$ (21) providing a decoded error residual signal $e'(n)$, with:

$$e'(n) = G \cdot CB(k)$$

B and M are used to tune a filter (22) feeding an adder (23), fed with $e'(n)$ and providing a decoded residual $r'(n)$, in turn filtered by an inverse adaptive predictor (25) tuned with the set of coefficients ai provided by the coder.

Obviously the coder/decoder efficiencies are closely dependent upon the codebook contents. According to the Art, both codebooks are made to store fixed and statistically set-up codewords. The present invention provides means for optimizing the codebook contents by making it dynamically speaker dependent. Codebook adjustments will be made either on a blind basis, i.e. coder and decoder operating independently, or on a cooperating basis in the course of a transmission process.

Figure 3:
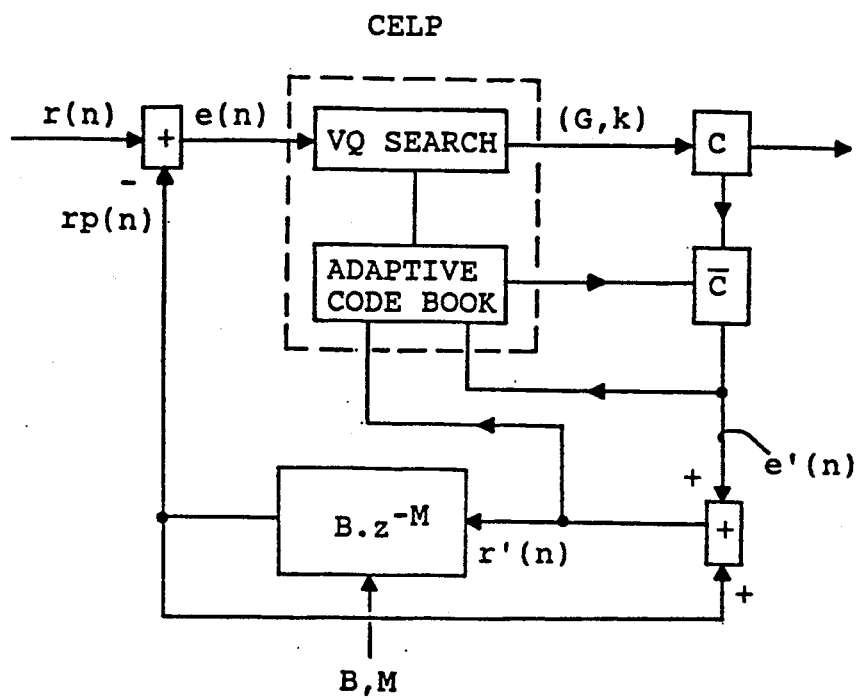
FIG. 3 is a block diagram showing the principles of the invention.

Represented in FIG. 3 is a block diagram showing the principle involved in this invention. As one may notice, entries have been provided to the CELP coder with both $e'(n)$ and $r'(n)$.

Figure 4:
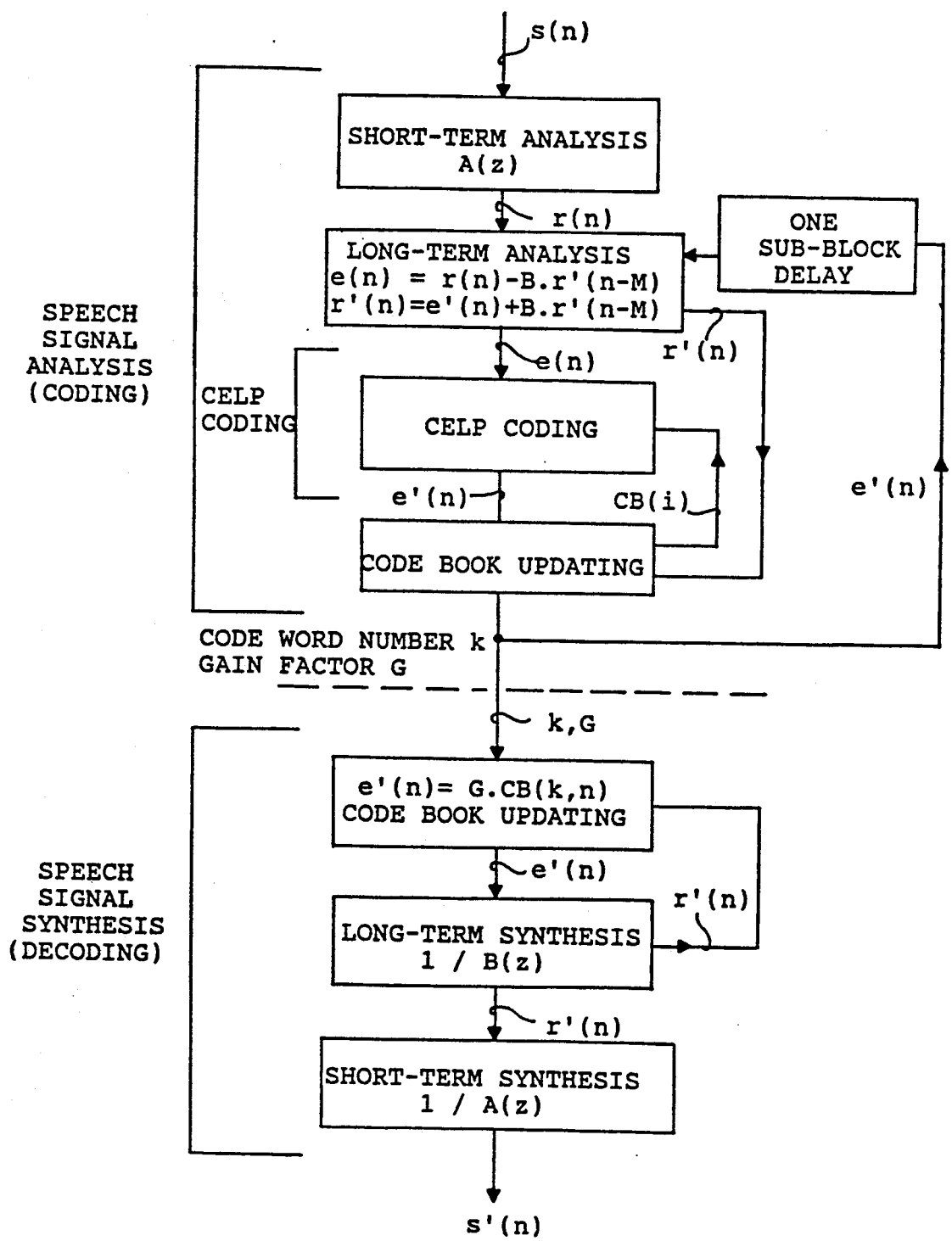
FIG. 4 is a flowchart for coding/decoding according to the invention.

As a consequence, the coding/decoding flow chart is made according to FIG. 4.

For speech signal analysis (coding), the input signal is filtered by the short-term predictor the transfer function of which is expressed in the z domain by $A(z)$, and provides the first residual signal r(n). The second residual, or error residual e(n) is derived from said first residual r(n) and from the output of long-term predictor applied on a previous reconstructed residual e'(n).

$$e(n) = r(n) - B \cdot r'(n-M)$$

$$r'(n) = e'(n) + B \cdot r'(n-M)$$

The residual signal e(n) coding is operated by sub-blocks of twenty samples, using a conventional simplified CELP technique with a codebook CB(l), with l=1, N+L−1, N being the total number of codewords within the codebook and L the sub-block length. For simplicity in the following, each possible L-sample long codeword will be denoted CB(i), i=1, N; CB(i)=(CB(1), 1=i, i+L−1. Said codebook is adaptively updated for each sub-block according to the previous sequence selected as will be described later. In other words, the residual e(n) is coded by a sequence CB of the current codebook and a gain factor G. Then the codebook contents CB(i) is updated for the next sub-block encoding, with a linear combination of the decoded second residual signal e'(n) and the decoded first residual r'(n).

For speech signal synthesis (decoding), the decoded residual error signal e'(n) is fed into the long-term prediction inverse filter followed by the short-term prediction inverse filter. The synthetic decoded first residual r'(n) is also used for codebook updating purposes.

Figure 5:
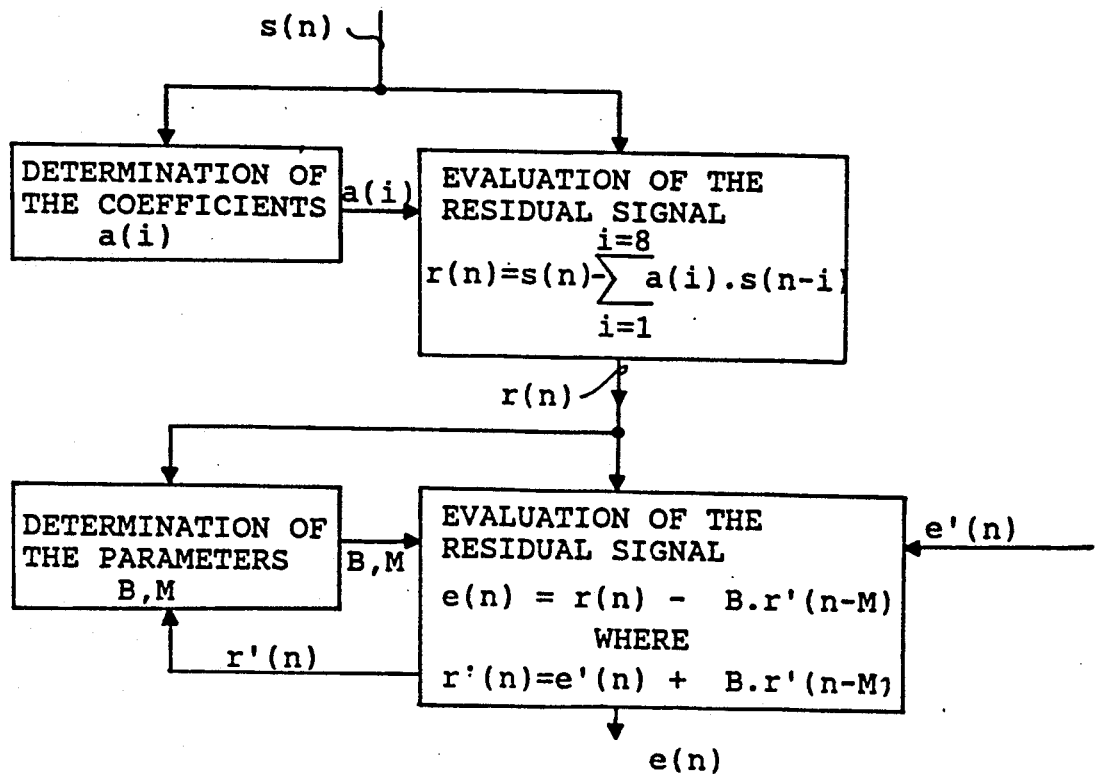
FIGS. 5–7 are flowcharts of operations involved in the invention.

Represented in FIG. 5 is a block diagram of the operations involved in performing both short-term and long-term analysis within the coder.

The original speech signal s(n) is processed to derive eight parcor related coefficients a(i) used to compute the residual r(n) signal through the following operations:

$$r(n) = s(n) - \sum_{i=1}^{i=8} a(i) \cdot s(n-i)$$

r(n) is used in the computation of B and M parameters, used in turn for computing the residual signals e(n) and r'(n).

Several methods are available for computing B and M values. One may for instance refer to B. S. Atal "Predictive Coding of Speech at low Bit Rate" published in IEEE Trans on Communication, Vol. COM-30, Apr. 1982; or to B. S. Atal and M. R. Schroeder, "Adaptive predictive coding of speech signals" Bell System Technical Journal, Vol. 49, 1970.

Generally speaking, M is a pitch value or an harmonic thereof. Assume the speech signals be split into 20 ms long blocks of samples, each considered by 2.5 ms long sub-blocks.

For each set of four sub-blocks of samples [r(n), n=1, ..., 80], cross-correlation operations R(k) are performed over samples of the previous sub-blocks of decoded residual signal r'(n−k) according to:

$$R(k) = \sum_{n=1}^{n=80} r(n) \cdot r'(n-k)$$

$$k = 29, \ldots, 120.$$

The peak value location of said R(k) function provides the M value looked for. Therefore:

$$R(M) = \underset{k=20}{\overset{k=120}{MAX}} R(k)$$

It should be noted that M is generally equal to an harmonic of the speaker's pitch period.

The long-term predictor gain coefficient B is then derived for the current sub-block of samples [(n), n=1, ..., 20], using:

$$B = \frac{\sum_{n=1}^{n=20} r(n) \cdot r'(n-M)}{\sum_{n=1}^{n=20} r'^2(n-M)}$$

For each sample of the current sub-block, one may then derive:

$$rp(n) = B \cdot r'(n-M)$$

$$e(n) = r(n) - rp(n)$$

Figure 6:
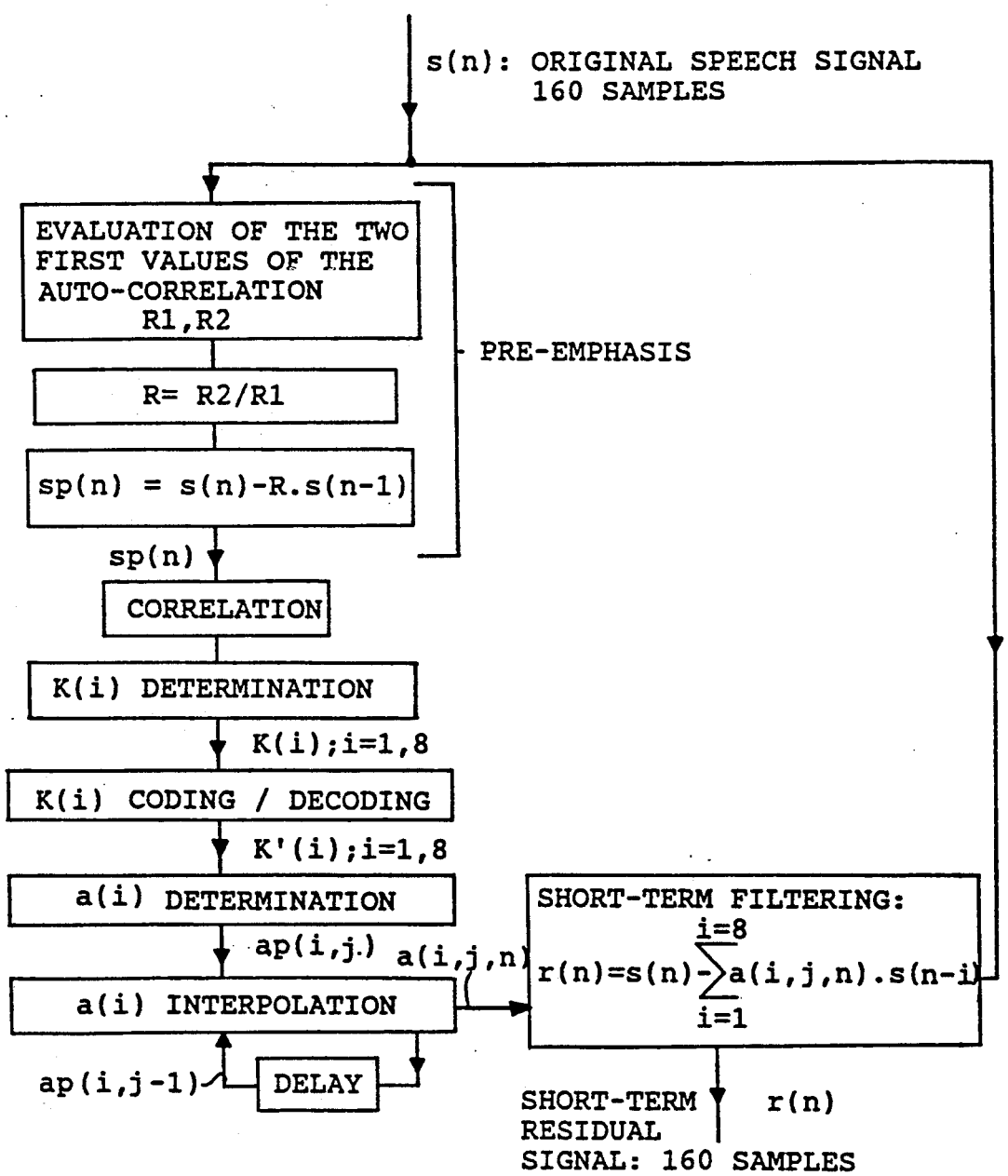

The short-term parcor related coefficients are, in fact, derived from a preemphasized s(n) made to introduce a noise shaping effect, as represented in the flowchart of FIG. 6. A pre-emphasis coefficient R is first computed, using:

$$R = R2/R1$$

$$R1 = \sum_{j=1}^{j=160} s(j) \cdot s(j)$$

$$R2 = \sum_{j=2}^{j=160} s(j-1) \cdot s(j)$$

The preemphasized speech signal is designated by sp(n), with:

$$sp(n) = s(n) - R \cdot s(n-1)$$

The pre-emphasized $a_i$ parameters are derived by a step-up procedure from so-called PARCOR coefficients K(i) in turn derived from the pre-emphasized signal sp(n) using a conventional Leroux-Guegen method. The $K_i$ coefficients may be coded with 28 bits using the Un/Yang algorithm. For reference to these methods and algorithm, one may refer to:

J. Leroux and C. Guegen: "A fixed point computation of partial correlation coefficients" IEEE Transactions on ASSP, pp. 257–259, June 1977.

C. K. Un and S. C. Yang: "Piecewise linear quantization of LPC reflexion coefficient" Proc. Int. Conf. on ASSP Hartford, May 1977.

J. D. Markel and A. H. Gray: "Linear prediction of speech" Springer Verlag 1976, Step-up procedure, pp. 94–95.

A further improvement to the above method for computing the a(i)'s is achieved by performing interpolation operations to minimize detrimental effects of a fast change over successive blocks of samples being analyzed, according to the following algorithm. Considering the prediction coefficients, computed for the current $j^{th}$ block of speech signal samples by the above methods be designated by ap(i,j) for i=1,8, then the prediction coefficients a(i,j,n), at time n, actually used for tuning both A(z) and 1/A(z) filters are given by:

$$a(i,j,n) = w^n \cdot ap(i,j) + (1-w^n) \cdot ap(i,j-1)$$

for $$i = 1, \ldots, 8.$$

and w<1 representing a decay factor, e.g. w=0.95.

The short-term filtering operations of filter A(z) are then performed to compute r(n) through:

$$r(n) = s(n) - \sum_{i=1}^{i=8} a(i,j,n) \cdot s(n-i)$$

Figure 7:
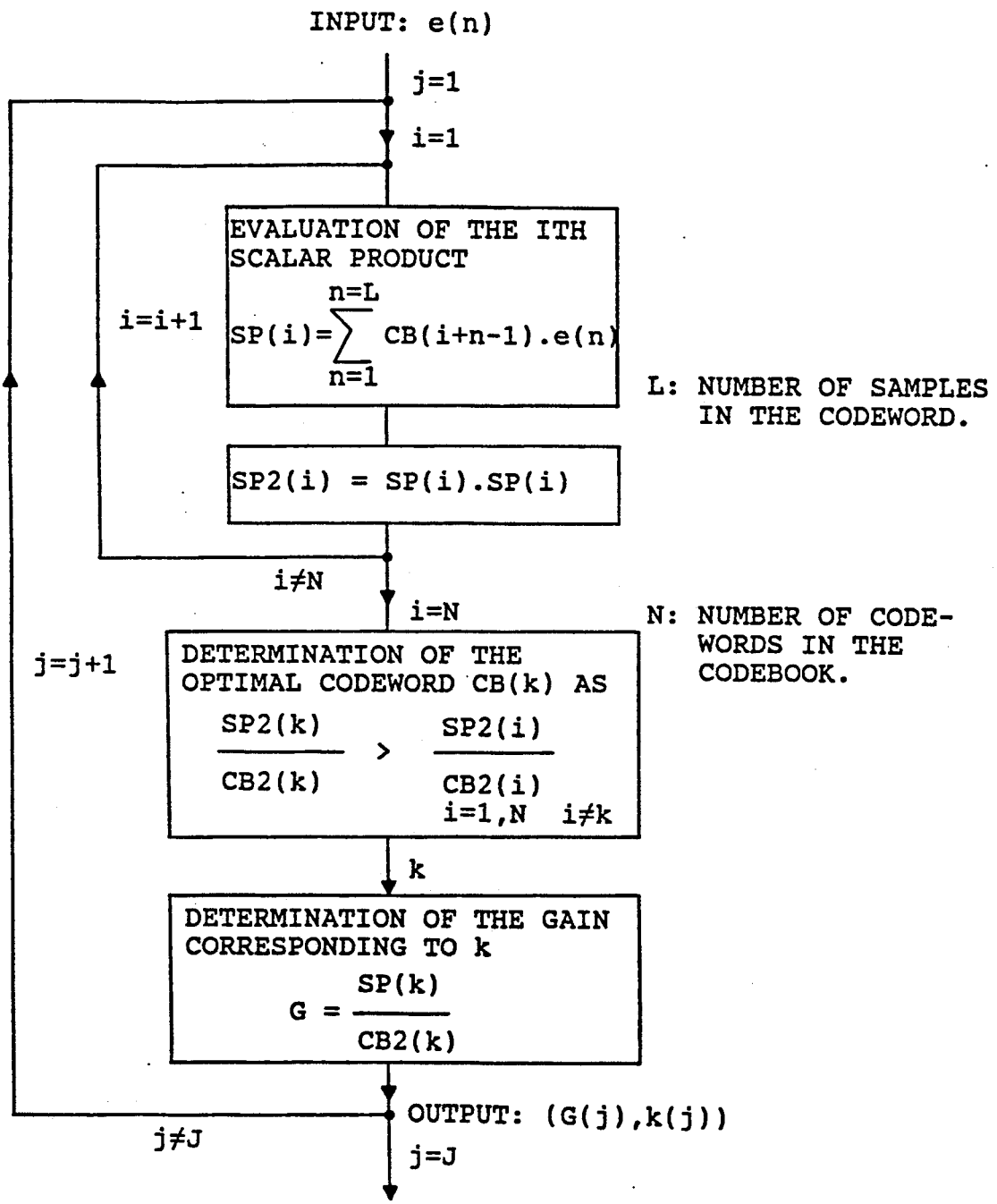

Represented in FIG. 7 is a flowchart describing the CELP encoding.

First two index counters i and j are set to i=1 and j=1. The table is sequentially scanned. A codeword CB(i) is read out of the table.

A first scalar product is computed, with i=1:

$$SP(i) = \sum_{n=1}^{L} CB(i+n-1) \cdot e(n)$$

This value is squared into SP2(i) and divided by the squared value of the corresponding codeword [i.e. CB2(i)]:

$$CB2(i) = \sum_{n=1}^{L} CB^2(i+n-1)$$

i is then incremented by one and the above operations are repeated until i=N, with N being the number of codewords in the code-book. The optimal codeword CB(k), which provides the maximum $$\frac{SP2(k)}{CB2(k)}$$

within the sequence $$\frac{SP2(i)}{CB2(i)}$$

for i=1,..., N is then selected. This operation enables detecting the table reference number k.

Once k is selected, then the corresponding gain factor is computed using:

$$G = \frac{SP(k)}{CB2(k)}$$

Assuming the number of samples within the sequence e(n) is selected to be a multiple of L, then said sequence e(n) is subdivided into J windows L samples long each, then j is incremented by 1 and the above process is repeated until j=J.

Computations may be simplified and the coder complexity reduced by normalizing the code-book in order to set each codeword energy to the unit value. In other words, the N component vectors amplitudes are normalized to one or a fixed value C.

$$CB2(i) = 1$$

for $$i = 1, \ldots, N.$$

or $$CB2(i) = C$$

In that case, the expression determining the best codeword k is simplified (all the denominators involved in the algorithm are equal to the unit value or to (C). On the other hand, to keep a good precision, the expression of G(k) is unchanged.

Figure 8:
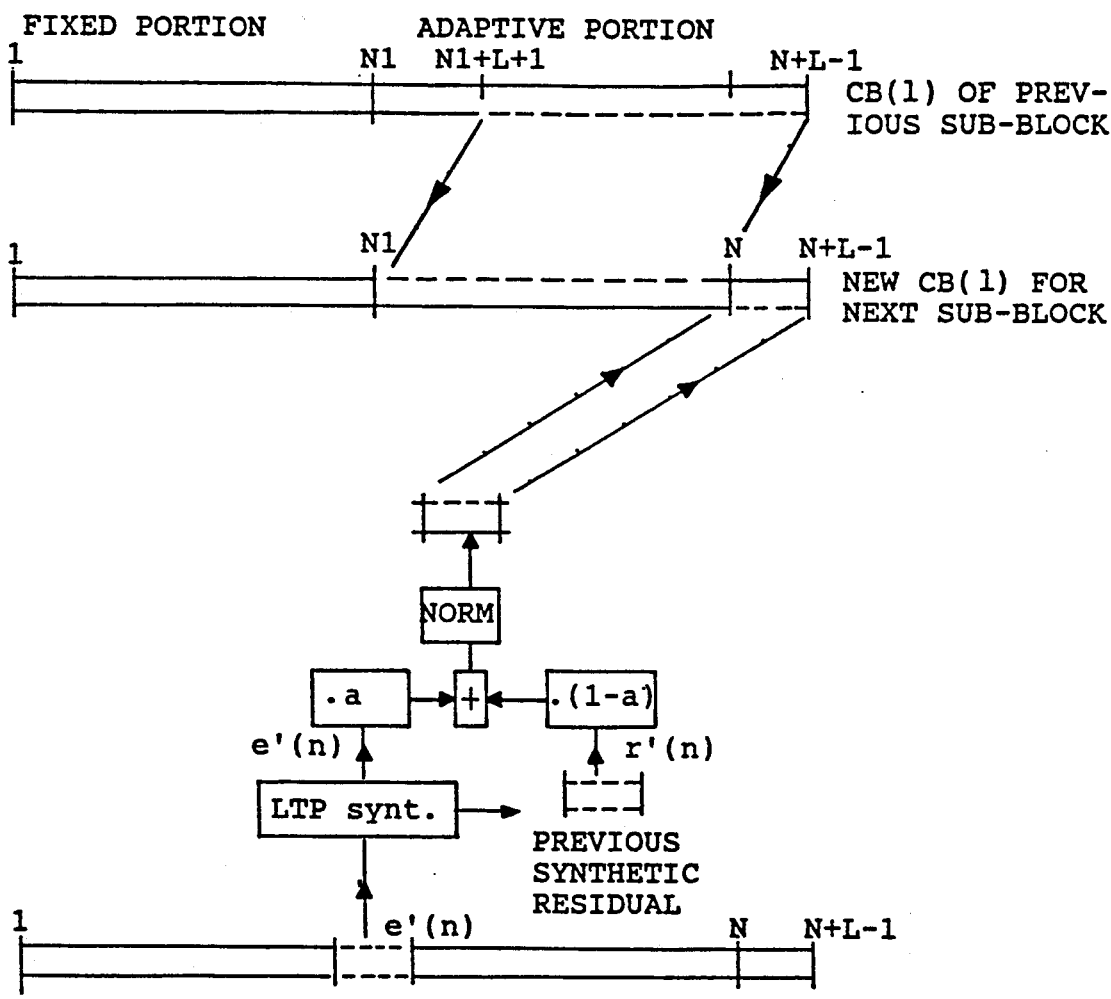
FIG. 8 illustrates a split codebook concept involved in the invention.

As already mentioned, substantial improvement is provided to the coder by dynamically adjusting the codebook contents to any involved speaker. Adjustment is achieved through a feedback updating process. Assume the original codebook is made to include N+L−1 predefined samples sequentially arranged, and assume best matching location is considered by shifting the current block or sub-block of samples to be CELP encoded, about the codebook. Said codebook is split into a fixed portion and an adaptive portion (see FIG. 8). In other words, the pre-stored codebook contents [CB(1); l=1, ..., N+L−1] is divided into:

a first portion CB(1); l=1, ..., N1, with N1 being a predefined codebook address. Said first portion is kept unchanged in the course of the adaptive codebook processing.

This fixed portion is made to store statistically selected sequences of voice residual signals, representative of silences, unvoiced parts of speech, and transients parts;

a second portion CB(1); l=N1+1, ..., N+L−1, initially set to store a sequence of voice residual signals representative of voiced parts of speech averaged on several voice corpuses.

This portion is to be updated in the course of the current voice coding process.

This strategy enables fitting to slowly changing signals (sustained vowels), while being able to match with fast variations (transients).

The variable codebook portion adaptation consists first in shifting said portion one codeword (L) to the left. In other words, the codebook addresses are changed to get CB(i)=CB(i+L); i.e. the codebook contents at the addresses between N1+L+1 and N+L−1 replacing the codebook section located between addresses N1+1 and N−1.

Then the codeword located between N and N+L−1 is replaced by the last coded block once normalized, i.e.:

$$CB(n) = NORM(a \cdot e'(n) + (1-a) \cdot r'(n))$$

where NORM stands for a normalization operator:

$$NORM(x(n)) = x(n) \cdot SQRT\left(C/\sum_{j=1}^{j=L} x^2(j)\right)$$

$$n = 1, \ldots, L.$$

where SQRT ( ) represents the square root function.

a<1 representing a weighting coefficient, e.g. a=0.8. C being the constant energy value for each codeword of the initial codebook:

CB2(i)=C for i=1,..., N.

Assuming the coder be a part of a transmission network (not shown), then, in the course of any transmission process, while codebook adaptation would be performed at one end (transmitting end) of the network, correlative adjustments should be brought to the receiving stations (on both the concerned receiver and its attached transmitter).

These adjustments may either be made with both end stations operating almost separately, or be boosted with a fast start-up operation made under the control of one of the stations. In any case, the codebooks updatings on both ends of the network should be synchronized.

Briefly stated for first type of operation, the system starts with both transmitting and receiving network stations updating their codebooks independently from each other. The transmitting station updatings are based on each transmitted codeword, but both transmitter and receiver systems of said station are codebook updated. At the other end of the network, the received codeword controls the codebooks updatings.

This mode of operation may lead to codebook contents being desynchronized. This is avoided by forcing codebook resettings to their original contents on a preselected specific event known to both ends of the network. The event should obviously be tied to the end of a conversation, but, in addition, the event might be tied to occurrence of long silences (silences longer than a predefined duration) in the course of any speech or conversation. Speech signal are then said to include talkspurts and resettings occur at each talkspurt start. The beginning of any talkspurt, i.e. the end of a long silence, is identified at the speaking party (transmitting end) through a so-called Voice Activity Detection (VAD) operation. VAD devices are known in the art, and one may, for instance, refer to European application published under No. 0127718 for further details.

At the receiving end of the network, the ending of a long silence may be identified through several means. For instance, a one bit flag may be attached to the received frame which enables detecting the desired event. As disclosed for instance in copending European application No. 84430015.2 said bit is simply made to change only when a long silence has ended and a new talkspurt has started. Said one bit changes are used to control codebook resettings.

Figure 9:
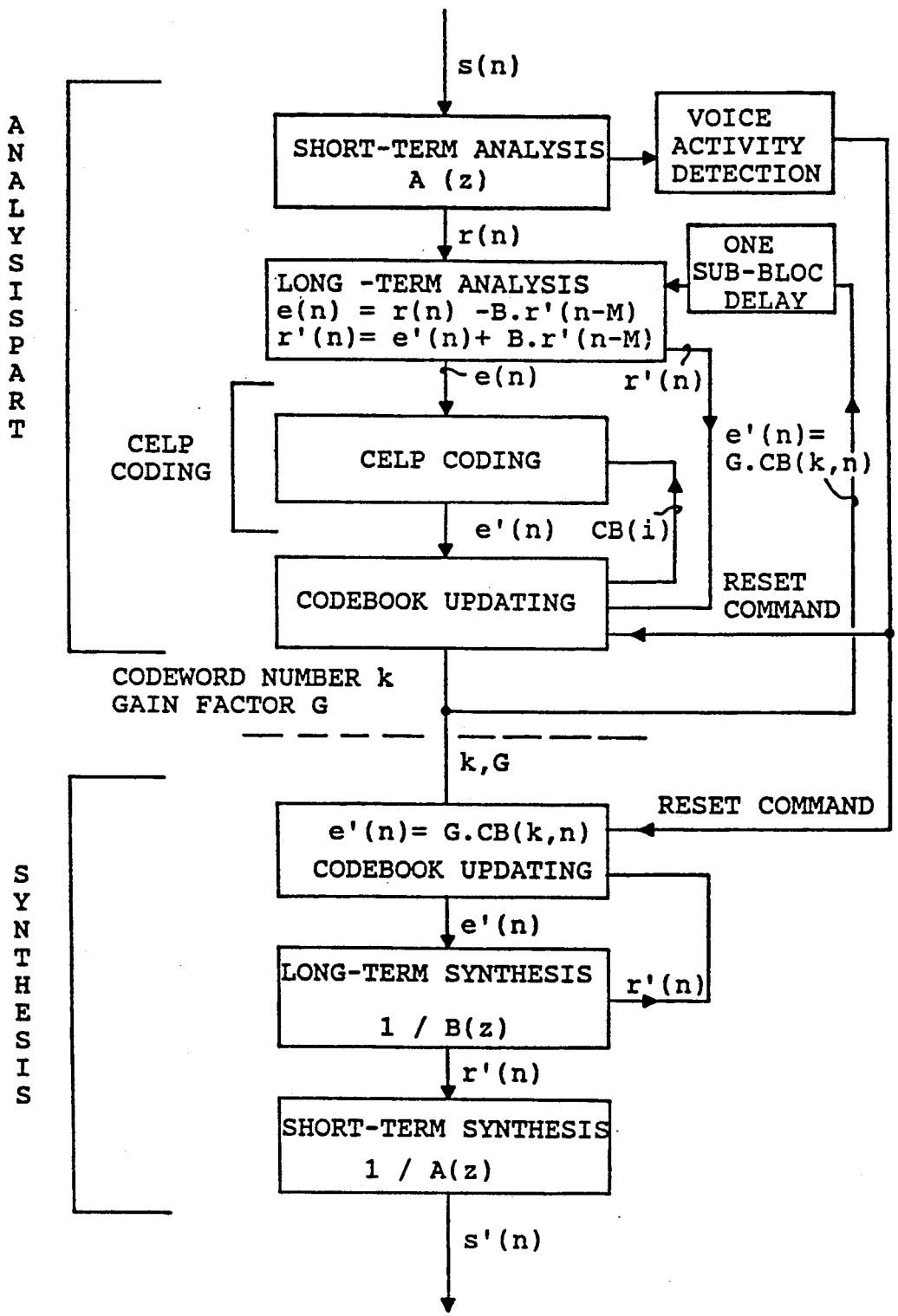
FIGS. 9 and 10 are flowcharts showing codebook resetting for the invention.

Represented in FIG. 9 is a flowchart showing the codebook resetting process wherein voice activity detection is being involved. The whole system normally runs as disclosed in connection with FIG. 4, except for voice activity detection involvement. The system is made to monitor the short-term analysis to detect any silence (i.e. no activity) within the speech being encoded. Whenever silences are detected, which are longer than a given threshold, the system sets a flag operating as a Reset Command. Said Reset Command resets both analysis and synthesis codebooks variable sections to their original contents, i.e. contents prior to any updating.

The adaptive codebook process may be boosted with a fast start-up dual coding. At the beginning of any talkspurt (VAD=1) the first 20 samples of residual signal r(n) are diverted from the CELP encoding. They are instead encoded by a 3-bit Block Companded PCM (BCPCM) quantizer, into rc(n). These coded samples are transmitted to the synthesizer and used locally as well as remotely at the other end of the network to update the corresponding codebooks and long term delay line. This corresponds to a frame stealing operation. One bit is used to indicate the fact that a side information is being transmitted.

Figure 10:
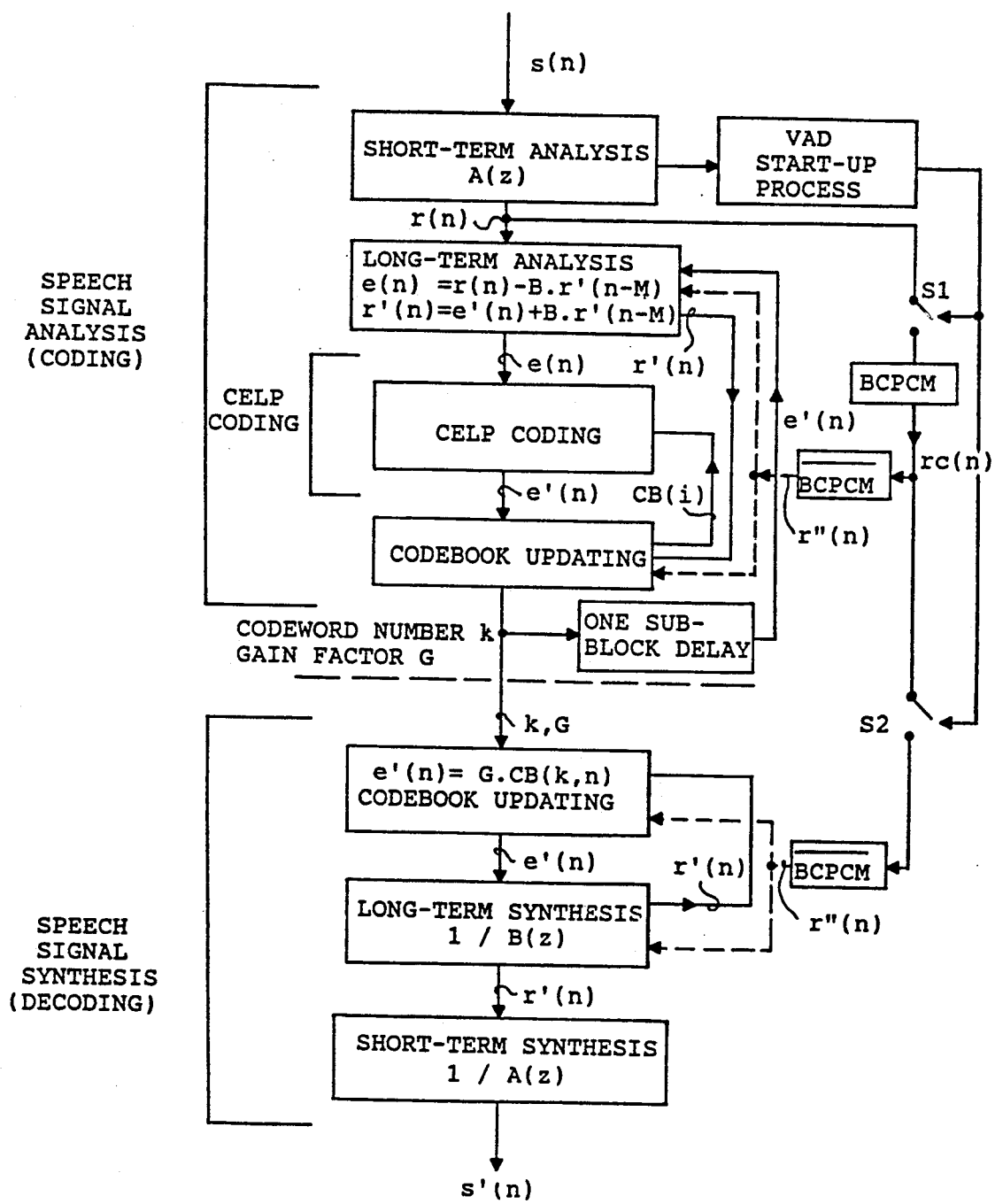

The above flowchart is represented in FIG. 10. A VAD flag is derived from short-term analysis of s(n), said flag indicates whether the current frame of signal samples represents a speech frame or a pause frame (silence). Consecutive pause frames are counted up to a predetermined value preselected to be representative of a long pause and a VAD flag is generated. In that case, the first subsequent frame of twenty samples of speech residual signal r(n) is diverted from the CELP coding (see switch S1 in FIG. 10) and BCPCM encoded instead into a frame rc(n). Said frame rc(n) is decoded into a frame r"(n) used as an r'(n) (or r'(n−M)) frame to perform long-term analysis operations on the considered frame. It is also used to update the local analyzer codebook (see doted lines in FIG. 10).

rc(n) is used for local synthesis by being first BCPCM decoded into r"(n) and used as an r'(n) frame to update the synthesizer codebook, through a switch S2 controlled by the VAD flag.

For each talkspurt, once said codebook has been first updated, subsequent updatings are operated as indicated with reference to FIGS. 3 and 4. In other words, any e(n) derived from long-term analysis through $$e(n)=r(n)-B\cdot r'(n-M)$$

is CELP encoded into k and G, to be used for synthesis purposes (see FIG. 10 showing a receiver synthesis).

During analysis, the selected codeword CB is used together with r'(n), to update the analyzer codebook.

As disclosed herein, the present CELP improvement suits particularly to the CELP/LTP type. It could by applied however to any coder of the CELP family.

For instance, a multirate structure was presented in co-pending European application No. 88480007.9 filed on Mar. 8, 1988.

Figure 11A:
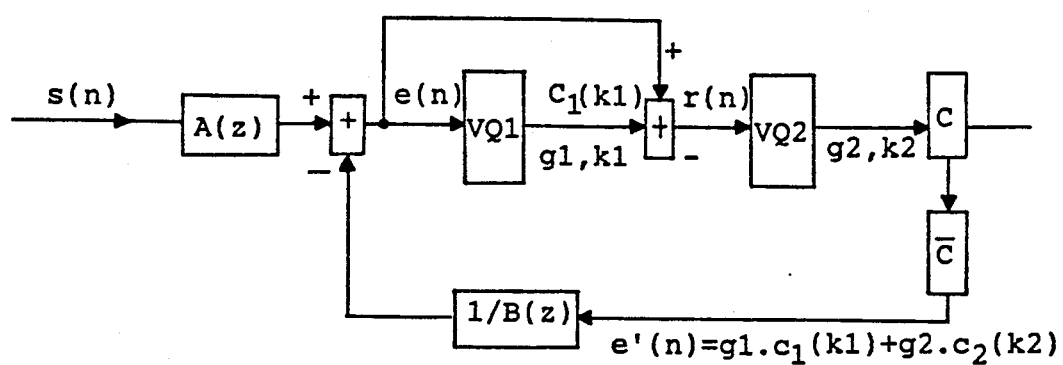
FIGS. 11A and B are block diagrams summarizing analysis and synthesis operations for multirate coding/decoding wherein the invention may be implemented.
Figure 11B:
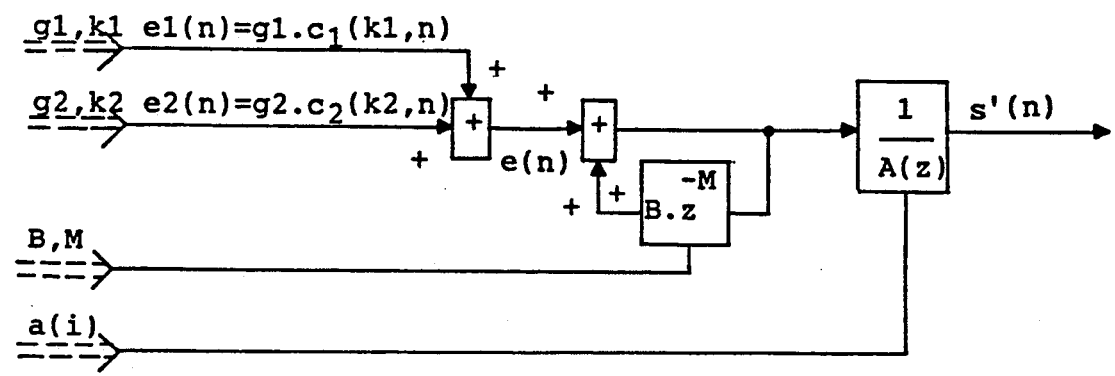

FIGS. 11A and 11B respectively summarize the analysis and synthesis operations involved in said multirate coding. The error signal e(n) is encoded by a first vector quantizer (CELP) VQ1. A quantizing error r(n) is generated to represent the differences between coded and uncoded e(n), and said quantizing error is, in turn, encoded into a second vector quantizer VQ2.

The resulting bit stream is made to be a concatenation of two bit streams; the first one being representative of the signal encoded at the low rate (corresponding to VQ1), and the other one being representative of the signal encoded at the high rate (corresponding to VQ2).

In case of need, e.g. overload over the transmission channel in a communication network, the bit stream may be switched back to low rate. In this context, the adaptive codebook algorithm can be applied to VQ1 (or VQ2) in a fairly straightforward manner.

We claim:

1. In a vector quantizing coder for coding a sequence of input signal samples into a codebook address pointing at a prestored codeword selected for providing the lowest mean square error with said sequence, a method for dynamically updating said codebook during coding, said method including:

splitting the codebook into a fixed content portion and a fixed length adaptive content portion;

updating said codebook by shifting into said fixed length adaptive content portion each selected codeword, whereby a previously stored codeword is shifted out of said fixed length adaptive content portion.

2. A method according to claim 1 wherein said input signal samples are a voice signal.

3. A method according to claim 2 wherein said voice signal is coded during a conversation including periods of voice activity, "talkspurts", separated by long pauses of predetermined length, said method being characterized in that said fixed length adaptive portion of said codebook is reset to its original contents at the beginning of each talkspurt identified through conventional voice activity detection operations.

4. A method according to claim 3, further including a fast start-up step including: detecting the first sequence of input signal samples of each said talkspurt; diverting said first sequence from the vector quantizing operation; coding said first sequence using block companded, pulse code modulated (BCPCM) techniques; and using said BCPCM coded sequence for the initial step of each talkspurt codebook updating.

5. A Code Excited Linear Prediction/Long-Term Prediction (CELP/LTP) speech coding device including adaptive filtering means for filtering a speech signal s(n) and deriving therefrom a residual signal r(n); means for generating a predicted residual signal rp(n); means for subtracting said predicted residual signal from said residual signal and deriving therefrom an error residual signal e(n); vector quantizing means connected to said subtracting means, said vector quantizing means including a codebook initially loaded with predefined codewords, and search means for converting sequences of consecutive e(n) samples into a codeword address, said codeword being selected within said codebook for providing the lowest mean square error with respect to said sequence, and a gain factor; a codeword coder for encoding said selected codeword, a codeword decoder connected to said codeword coder for providing a decoded error signal e'(n); a long-term prediction (LTP) feedback loop connected to said codeword decoder for providing a decoded residual signal r'(n) and said rp(n) signal; said vector quantizing means being characterized in that it includes:

means for splitting said codebook codewords into a fixed content codebook portion and a fixed length adaptive contents codebook portion;

normalizing means connected to said codeword decoder and to said LTP feedback loop for generating normalized selected codewords CB(i) wherein:

$$CB(i) = NORM\ (a \cdot e'(i) + (1-a) \cdot r'(i))$$

wherein NORM stands for a normalization operation according to:

$$NORM\ (x(i)) = x(i)\ SQRT\left(C/\sum_{j=1}^{j=L} x^2(j)\right)$$

$$i = 1, 2, \ldots, L$$

wherein $a < 1$ represents a preselected weighting coefficient and SQRT represents the square root function, and C is a normalizing predefined fixed value.

loading means connected to said normalizing means for shifting said normalized selected codeword into said fixed length adaptive contents codebook portion, whereby a previously stored codeword therein is shifted out therefrom.

6. A speech coding device according to claim 5 further including:

a voice activity detector (VAD) sensitive to said speech signal S(n) for detecting the occurrence of beginning and end of any silences longer than a predefined duration, said silences delimiting so-called talkspurts, and for generating a VAD flag at the beginning of each said talkspurt;

resetting means sensitive to said VAD flag for resetting said fixed length adaptive contents codebook portion to its initial contents.

7. A speech coding device according to claim 6 further including:

Block companding PCM (BCPCM) coding and decoding means;

delay means fed with said residual signal r(n) and sensitive to said VAD flag for diverting the first sequence of speech signal samples to be encoded at the beginning of each talkspurt from said CELP/LTP coding device into said BCPCM coding and decoding means;

means for feeding a decoded sequence of samples from said BCPCM coding and decoding means into said fixed length adaptive contents codebook portion.

* * * * *